(12) United States Patent
Fischel

(10) Patent No.: US 8,124,296 B1
(45) Date of Patent: *Feb. 28, 2012

(54) THICK ELECTRODE DIRECT REACTION FUEL CELLS UTILIZING CROSS-FLOWS AND TAYLOR VORTEX FLOWS

(75) Inventor: Halbert Fischel, Santa Barbara, CA (US)

(73) Assignee: Global Energy Science, LLC (California), Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/174,686

(22) Filed: Jun. 30, 2011

Related U.S. Application Data

(60) Provisional application No. 61/388,359, filed on Sep. 30, 2010.

(51) Int. Cl.
 *H01M 8/02* (2006.01)
(52) U.S. Cl. .................................. 429/513; 429/454
(58) Field of Classification Search .................. 429/513
 See application file for complete search history.

(56) References Cited

U.S. PATENT DOCUMENTS

| | | | |
|---|---|---|---|
| 5,616,431 A * | 4/1997 | Kusunoki et al. ............. | 429/460 |
| 5,830,593 A | 11/1998 | Nielson | |
| 6,319,293 B1 | 11/2001 | Debe et al. | |
| 6,713,206 B2 | 3/2004 | Markoski et al. | |
| 7,488,547 B1 | 2/2009 | Iacovelli | |
| 7,972,747 B2 * | 7/2011 | Fischel ........................ | 429/513 |
| 2007/0020142 A1 | 1/2007 | Federspiel et al. | |
| 2010/0068623 A1 | 3/2010 | Braun et al. | |

OTHER PUBLICATIONS

Gabe et al, The rotating cylinder electrode: a recent development, Reviews of Applied Electrochemistry 6, Journal of Applied Electrochemistry 13 Mar. 22, 1983.
Gabe et al, The rotating cylinder electrode: its continued development and application, Reviews of Applied Electrochemistry 49, J. of Applied Electrochemistry 28 (1998) pp. 759-780.
Bagotsky, Fundamentals of Electrochemistry Second Edition, John Wiley & Sons, Inc., Hoboken, NJ, USA, © 2006, §4.4—Convective Transport, pp. 60-67.
Newman, Electrochemical Systems, Third Edition, John Wiley & Sons, Inc., Hoboken, NJ, USA, © 2004, Chapter 17—Convective-Transport Problems, §17.3-§17.8, pp. 382-399.
Taylor, Stability of a Viscous Liquid Contained Between Two Rotating Cylinders, Philosophical Transactions of the Royal Society of London. Series A, Containing Papers of a Mathematical of Physical Character, vol. 223 (1923) pp. 289-343.
Newman, Electrochemical Systems, Third Edition, John Wiley & Sons, Inc., Hoboken, NJ, USA, © 2004, Chapter 1—Introduction, §1.4 Transport, pp. 8-18.
Bagotsky, Fundamentals of Chemistry, Second Edition, John Wiley & Sons, Inc., Hoboken, NJ, USA, © 2006, Preface to First Edition, pp. xix-xxi & §1.6 Classification of Electrodes and Electrode Reactions, pp. 12-15.

(Continued)

*Primary Examiner* — Patrick Ryan
*Assistant Examiner* — Brent Thomas
(74) *Attorney, Agent, or Firm* — Sheldon L. Epstein; Malcolm J. Chisholm, Jr.; Pamela Curbelo

(57) ABSTRACT

Direct reaction fuel cells (10) with cross-flow of an electrolyte mixture through thick, porous electrodes (12, 18) that contain a mixture of catalyst particles and that rotate to generate Taylor Vortex Flows (54) and Circular Couette Flows (56) in electrolyte chambers (24) are disclosed.

13 Claims, 2 Drawing Sheets

OTHER PUBLICATIONS

Figure 2:
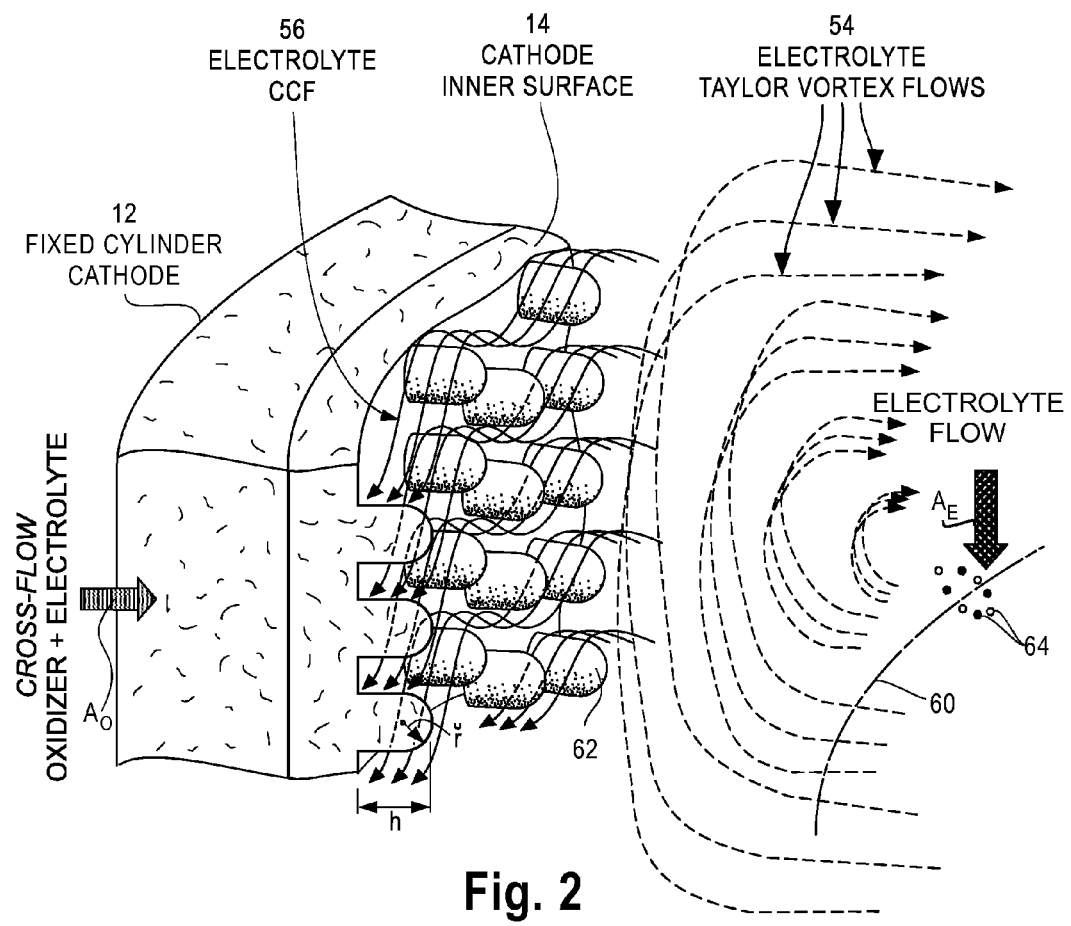

Newman, Electrochemical Systems, Third Edition, John Wiley & Sons, Inc., Hoboken, NJ, USA, © 2004, Preface to the First Edition, pp. xix-xx & §1.2 Thermodynamics and Potential, pp. 4-7.

Pletcher & Walsh, Industrial Electrochemistry Second Edition, London, UK, © 1982, Preface pp. viii-x; Chapter 7, §(d) pp. 346-350 & Chapter 11, p. 543.

Delgado et al, Measurement and Interpretatin of Electrokinetic Phenomena, Pure Appl. Chem., vol. 77, No. 10, © 2005, pp. 1753-1805.

Skowroriski et al, Nickel Foam-based (Ni(OH)2/Ni0OH Electrode as Catalytic System for Methanol Oxidation in Alkaline Solution, © 2006, J. New Mat. Electrochemical Systems, vol. 9, pp. 345-351.

Ferrigno et al, "Membraneless Vanadium Redox Fuel Cell Using Laminar Flow", JACS Communications, vol. 124, 2002, pp. 12930-12931.

* cited by examiner

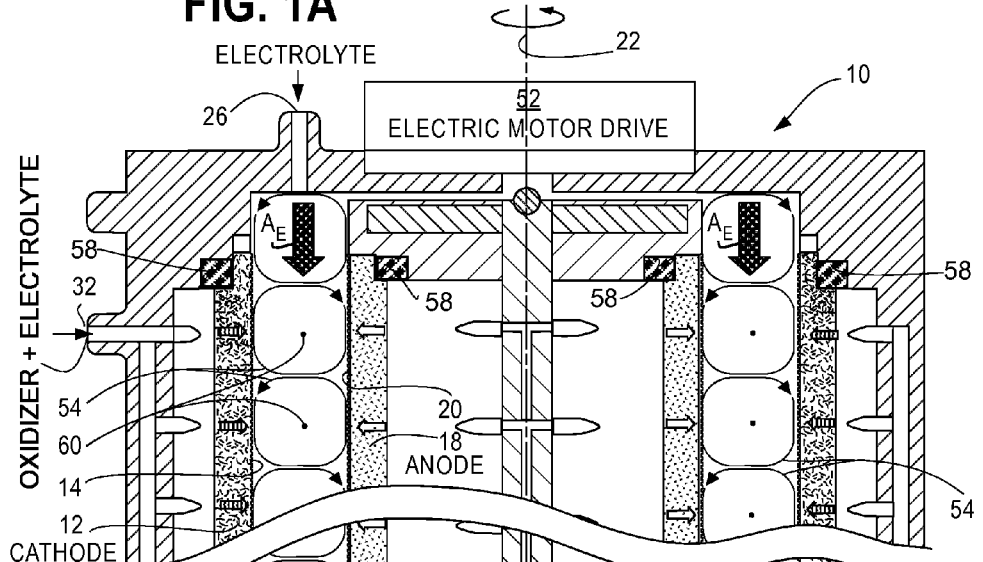
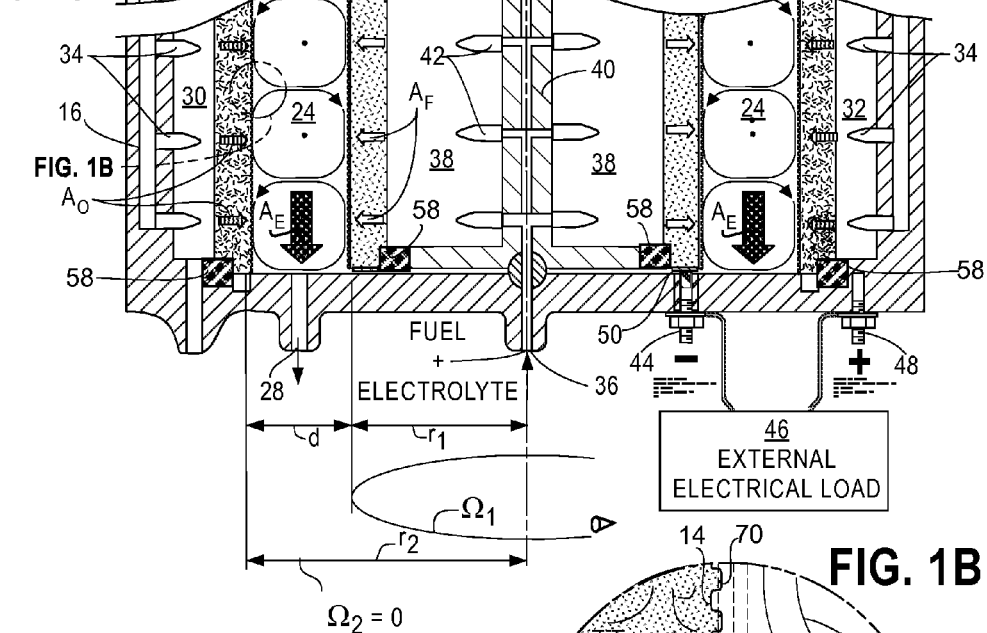
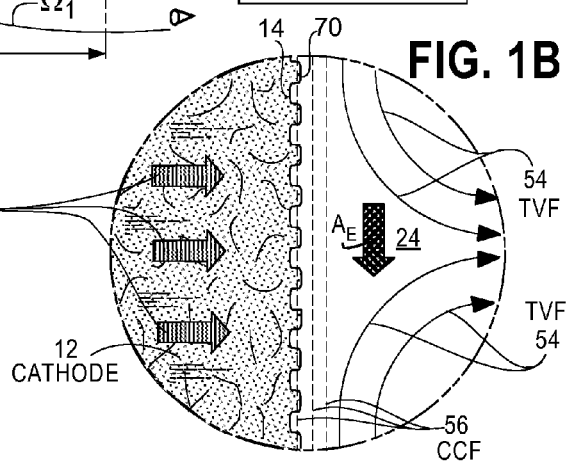

THICK ELECTRODE DIRECT REACTION FUEL CELLS UTILIZING CROSS-FLOWS AND TAYLOR VORTEX FLOWS

CROSS-REFERENCE TO RELATED APPLICATIONS

This patent application claims the benefit of U.S. Provisional Patent Application No. 61/388,359 filed 30 Sep. 2010, and of International Patent Application No. PCT/US10/39885 filed 25 Jun. 2010, which is a continuation-in-part of U.S. patent application Ser. Nos. 12/800,658 (U.S. Pat. No. 8,017,261 of 13 Sep. 2011); 12/800,710; 12/800,657; 12/800,672 (U.S. Pat. No. 7,972,747 of 5 Jul. 2011); and 12/800,709 (U.S. Pat. No. 7,964,301 of 21 Jun. 2011)—all filed on 20 May 2010. All of these applications claim priority from U.S. Provisional Patent Application 61/220,583 filed 26 Jun. 2009, are hereby incorporated herein by reference in their entirety and have been assigned to the assignee of this application.

This application, identified as Case G, is related to my following applications:

Case A: Electrochemical Cells Utilizing Taylor Vortex Flows, application Ser. No. 12/800,658 of 20 May 2010, published as US 2010-0330439 A1 on 31 Dec. 2010, now U.S. Pat. No. 8,017,261 of 13 Sep. 2011;

Case B: Fuel Reformers Utilizing Taylor Vortex Flows, application Ser. No. 12/800,710 of 20 May 2010, published as US 2010-0330445 A1 on 31 Dec. 2010;

Case C: Chemical Process Accelerator Systems Utilizing Taylor Vortex Flows, application Ser. No. 12/800,657 of 20 May 2010, now US 2010-0329947 A1 of 31 Dec. 2010;

Case D; Direct Reaction Fuel Cells Utilizing Taylor Vortex Flows, application Ser. No. 12/800,672 of 20 May 2010, published as US 2010-0330459 A1 on 31 Dec. 2010, now U.S. Pat. No. 7,972,747 on 5 Jul. 2011;

Case E: Dynamic Accelerated Reaction Batteries Utilizing Taylor Vortex Flows, with Philip Michael Lubin and Daniel Timothy Lubin, application Ser. No. 12/800,709 of 20 May 2010, published as US 2010-0330460 A1 on 20 May 2010, now U.S. Pat. No. 7,964,301 of 21 Jun. 2011; and Case F: Cross Flow Electrochemical Cells & Batteries, Provisional Application Ser. No. 61/388,359 of 30 Sep. 2010, now application Ser. No. 13/171080 of 28 Jun. 2011.

Cases A-E claim the benefit of my U.S. Provisional Application No. 61/220,583 filed 26 Jun. 2009. Case F is a continuation-in-part of my provisional application.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF INVENTION

1. Field of the Invention

This invention is in the field of Direct Reaction Fuel Cells used to convert chemical energy in high-hydrogen-content fuels directly into electrical energy without burning the fuels for heat energy or reforming them for production of $H_2$ and incorporating thick electrodes filled with catalyst, electrolyte cross-flow through the electrodes and means to provide relative motion between an electrode and an electrolyte between electrodes—including means for rotating an electrode (U.S. Class 429/67-69, Int. Class H01M 2/38), and means for allowing a fluid reactant or electrolyte to enter or leave the cell (U.S. Class 429/513, Int. Class H01M 8/04) so as to achieve accelerated chemical reaction rates promoted by Taylor Vortex Flows (TVF) and Circular Couette Flows (CCF).

2. Description of Related Art

A majority of current fuel cells employing aqueous chemistry typically incorporate electrodes having thicknesses of less than 150 microns (micrometers of μm) and proton exchange membranes (PEM) to retain electrolyte and to prevent crossover of fuel and oxidizer in the cells' electrolytes. These membranes also function as electrically-insulating separators between anode and cathode electrodes that are in contact with opposite faces of the membranes. A combination of the PEM and its electrodes is called a membrane electrode assembly (MEA).

PEM, such as NAFION® synthetic polymer, limit choices of electrolytes, temperatures and pressures of three-phase reduction/oxygen (redox) reactions of fuel-electrolyte-catalyst and oxidizer-electrolyte-catalyst that occur at interfaces of the membrane and its contiguous catalyst-bearing anode and cathode electrodes that form a membrane electrode assembly (MEA). In the case of NAFION polymer PEM, acidic electrolytes must be used and the operating temperature must not exceed 190° C. As a result, expensive catalysts (e.g., Platinum Group metals) are required to promote redox reactions while not corroding in electrolyte. Additionally, liquid fuels and oxidizers must be reformed to obtain gases and undesirable reactants (e.g., water) must be removed by a balance of plant (BOP).

The MEA electrode-PEM interfaces host gas diffusion layers where the redox reactions can occur. These layers are typically 10-50 microns (μm or micrometers) thick. The electrode faces adjacent the PEM contain catalyst particles (e.g., platinum, platinum alloys) to a depth of about 10-30 microns, which is approximately 1% of the thickness of a MEA. The thin gas diffusion layers contribute to limiting current densities to approximately 300 milliamperes per $cm^2$ of electrode. Consequently, prior art fuel cells are uncompetitive in terms of cost-per-watt and power-per $cm^3$. This is especially true for PEM Direct Reaction Fuel Cells.

My Direct Reaction Fuel Cells (DRFC), taught in Case D, and my Thick Electrode Direct Reaction Fuel Cells Utilizing Taylor Vortex Flows (TEDRFC), taught here, overcome temperature, proton transfer rate, oxygen reduction overvoltage, electrolyte storage and chemistry selection limitations of PEM fuel cells by eliminating any need for PEM and by providing a fuel cell containing means for creating Taylor Vortex Flows (TVF) in the electrolyte between its cathode and anode electrodes. TVF permits aqueous fuel cell operating temperatures to increase beyond the 190° C. PEM limit imposed by PEM and allows higher temperatures of 200° C. or more. Higher temperatures promote higher redox reaction rates and allow replacement of expensive Platinum Group metal catalysts with economical nickel and other low-cost catalysts. The elimination of PEM also removes restrictions on a selection of chemistries and permits use of either acid or alkali electrolytes, which offers more choices for handling and disposal of reaction byproducts (e.g., CO) or end products (e.g., $H_2O$). TEDRFC of this invention provide further improvements in fuel cell current density and economics by providing new structures that facilitate use of electrolyte cross-flow through thick electrodes to achieve unprecedented current densities at lower capital cost.

GENERAL DESCRIPTION OF THE INVENTION

TEDRFC of this invention decouple a limiting relationship between current density and reaction rate found in prior art fuel cells to obtain higher output current and power density (Watts/$cm^3$). This achievement is obtained by rearranging fuel cell components so that a) thicker electrodes can be used, b) entire volumes of the electrodes can be filled with catalyst and 3) cross-flow of electrolyte and fuel or oxidizer through electrodes that can participate in three-phase reduction or oxidation (redox) reactions with increased surface areas made possible by combinations of the thicker electrodes and their impregnated catalysts.

Thickness in a PEM fuel cell electrode is measured in an orthogonal direction from the electrode-PEM interface. In a TEDRFC comprising anode and cathode electrodes and an electrolyte or dielectric gap between the electrodes, electrode thickness is measured in an orthogonal direction from an interface of the electrode and the gap.

Thick electrodes are filled with catalytic particles and perfused with a cross-flow (e.g., transverse flow in a direction approximately orthogonal to the interface between the electrode and the gap) of either fuel or oxidizer mixed with electrolyte. The passage of the mixture through the thickness of the electrodes increases the depth of redox reactions from perhaps 50 microns in a conventional fuel cell to approximately the full thickness of the electrodes. This facilitates the participation of more electrolyte and greater stoichiometric amounts of fuel or oxidizer on catalytic surfaces in redox reactions for a given fuel cell volume. Also, the thickness of electrodes is now sufficient to promote residence times for electrolyte and fuel or oxidizer that exceed their inherent reaction-rate time limitations. Additionally, excess coordinated ions are created within the depth of the anode and cathode electrodes so that simultaneous stoichiometric balance between electrolyte and reactants is more easily achieved. Because each of these improvements contributes to increased power and energy density and operating temperatures can be increased above 200° C., it is now practical to incorporate nickel or other less expensive catalysts to achieve commercially acceptable performance/cost targets.

My Case F introduces a unique application of thick electrodes in battery cells. By way of comparison, prior art battery electrodes are about 10-100 microns thick with a narrower reaction zone thickness of 1-30 micron of electrode being electrochemically active at any one time. My Case F electrodes can be 3,175 to 12,500 microns thick—all of which is electrochemically active.

A conceptual comparison of my Case F cross-flow battery to my TEDRFC described here may be useful for understanding complexities of fuel cell dynamics. Both the battery and the fuel cell incorporate flow-through, fine porous metal structures of substantial thickness (in the direction of fluid flow) that contain highly-dispersed, high-surface-area, particulate material. However there is a major structural and conceptual difference between the batteries and the fuel cells; namely, the batteries support two redox phases (liquid electrolyte with solid faradaic materials) while the fuel cells support three redox phases (liquid electrolyte, gaseous fuel and gaseous oxidizer with solid catalytic materials).

Faradaic material in a battery stores energy while in a fuel cell energy is introduced through the fuel. In a fuel cell, the solid phase participating in the redox reaction is a catalyst, even though, in some cases, it participates temporarily in the redox reaction.

The essential commonality between my cross-flow batteries and my TEDRFC is that aqueous redox chemical reactions produce cations deep within an anode and anions deep within a cathode. These features distinguish my cross-flow batteries and TEDRFC from prior art batteries and fuel cells where these ions are produced at surfaces or in thin layers or zones adjacent to surfaces.

A feature of both the cross-flow batteries and the TRDRFC is that they can move these ions from deep within their respective electrodes to a place between (e.g., an inter-electrode gap containing electrolyte) where anions can neutralize cations. The flow of these excess ions toward each other from deep within their respective electrodes creates an ionic charge current that exactly balances the flow of electrons through an external electrical load.

In my cross-flow batteries, an incompressible liquid electrolyte fully performs the essential function of excess ion inter-electrode transfer. In my TEDRFC taught here, a gas phase within the porous electrode imposes a more stringent requirement on system parameters. In particular, the liquid phase within each electrode (electrolyte containing accumulated excess ions) is drawn into electrolyte flowing in the gap between electrodes because of a pressure differential established in response to controlled axial flow of TVF electrolyte in that gap. Furthermore, TVF in the gap creates a suction that specifically operates on the gas phase coming from facing surfaces of each electrode in the form of emitted bubbles captured by vortices in the TVF. In addition, electro-magnetic and electro-acoustic forces can be brought to bear upon excess charges created within depth electrodes to accelerate their transport in their preferred directions toward the gap.

Additionally, the electrodes of my TEDRFC can be 500 to 10,000 microns thick—all of which can be loaded with catalyst. TEDRFCs employ less active and less expensive catalyst particles; but, far more of them. One expensive catalyst that could be selected for use in an alkaline-electrolyte TEDRFC is silver for the oxygen reduction reaction (ORR). The historical average price of silver is about 1% of an equivalent weight of platinum.

Silver and platinum have respective has mass densities of 10.5 and 21.45 gm/ml. When silver is employed at 100 times the mass of platinum at equal cost, silver provides 200-times the number of same-sized particles and 200-times the amount of active catalyst area.

In a typical ORR projected cross-sectional electrode platinum has a loading factor is 0.5 mgm/$cm^2$. Where 1% of the reaction zone volume is platinum, this loading factor provides a reaction zone thickness of only 23 microns. This sparse distribution of platinum particle catalyst surface per unit reaction zone volume is suitable for tangential flow of air or oxygen gas; however, much of the oxidizer passes unreacted.

TEDRFC electrode cross-flow is better served by high catalyst surface volume density where a loading factor of 50 mgm/$cm^2$ of silver at 50% density provides a reaction zone thickness of 95 microns. Silver provides 200 times as many particles as the number of platinum particles and yields 48 times as much active catalytic area per unit reaction zone volume as platinum. Even if the dispersed surface area per gram or specific catalytic activity of silver is only $1/10^{th}$ that of platinum, silver would still have 20 times the net catalytic activity for the ORR electrode. This yields a very conservative power rating of 10 W/cm² of electrode; provided, the supporting electrode structure is sufficiently electrically conductive to minimize $i^2R$ loss.

On a comparable cost-per-kilowatt basis, the silver loading factor could be increased to 1 gm/cm² for a reaction zone thickness of 1,900 microns. This is approximately 40 to 80-times the thickness of gas diffusion layers in prior art PEM DRFC. Catalysts having somewhat less specific surface activity for the ORR (e.g., $MnO_2$) are less costly than platinum or silver; but, provide equivalent net power performance when utilized with greatly increased active area density dispersed within and throughout thick porous electrodes. This is especially true for TEDRFC of this invention operating at higher temperatures that lower ORR overvoltage.

This invention increases the current density limitation of prior art fuel cells by providing TEDRFC that incorporate catalyst-filled electrodes that can be 250, 500, 1000, 5000 or 10,000 microns or more thick. Because catalyst volumes can be greater, a tradeoff is practical that uses a greater amount of much less expensive and active catalysts (e.g., RANEY® or nanoflake nickel or NiO(OH) in the anode) in place of expensive Platinum Group metals. NiO(OH) nanoflake is particularly effective as a catalyst for methanol oxidation because of its high surface activity for moving hydrogen in and protons out of its molecular structure. As a result of providing new thick electrodes packed with substantially more catalyst, current densities of 5, 10 or 20 ampere per cm² can be attained in fuel cells that can compete commercially with other sources of electrical energy.

An important feature of my TEDRFC is the introduction of cross-flow of electrolyte, which is electrolyte moving within a thick, porous electrode in a direction that is transverse to the flow of electrolyte between electrodes in a fuel cell. Flow-through porous electrodes, which share some similarities to cross-flow electrodes, have been used in electrolytic cells for recovery and removal of electro-positive metals (e.g.; silver, gold, copper and mercury) and other purposes; however, they have been not used in galvanic cells, such as fuel cells, to promote redox reactions. Cross-flow of electrolyte in fuel cells now supports redox reactions throughout the entire catalyst-impregnated interiors of the electrodes, instead of just at thin reaction zones in conventional fuel cells.

In order to carry out a high level of catalyzed redox activity within TEDRFC porous electrodes that are so much thicker than DRFC electrodes of Case D or any electrodes used in prior art fuel cells, my invention takes advantage of the unique properties of aerosolized mixtures of fuel and oxidizer with electrolyte. Fuel and oxidizer are employed in their gaseous phases as carriers of finely aerosolized mists of electrolyte. When introduced into their respective electrodes, microscopic droplets of fuel or oxidizer-saturated electrolyte move cross-flow through the electrode and coat highly-dispersed, catalytic surfaces with a thin, liquid film.

It is therefore an advantage of the present invention to provide an improvement over the robust direct reaction fuel cell (DRFC) of Case D by providing thick, densely catalytic porous electrodes.

A second advantage of this invention is to provide direct reaction fuel cells that have thicker porous electrodes than conventional fuel cells in order to incorporate greater total amounts of catalyst surface that increase volumetric electrode current density (Amperes/cm$^3$) than are available in prior art electrodes.

A third advantage of this invention is to provide a fuel cell with cross-flow of fuel or oxidizer to provide a greater cross-sectional electrode current density (Amperes/cm$^2$) than is possible with prior art electrodes.

A fourth advantage of this invention is to provide a fuel cell with cross-flow electrodes of at least 250 microns in thickness.

A fifth advantage of this invention is to reduce the thickness of liquid electrolyte films on catalyst surfaces within porous electrodes of a fuel cell in order to promote rapid ion exchange, adsorption and desorption of reaction products and initial saturation of fuel or oxygen.

A sixth advantage of this invention is to provide a fuel cell configured for rapid removal of reaction products and neutralization of excess ions using circulating TVF and CCF between electrodes.

A seventh advantage of this invention is to provide a fuel cell comprising means for pumping an aerosol mixture of fuel or oxidizer in electrolyte cross-flow through an electrode.

An eighth advantage of this invention is to provide a method for operating a fuel cell comprising the step of pumping an aerosol mixture of fuel or oxidizer in electrolyte cross-flow through an electrode.

These advantages are more fully set forth in the following description of a preferred embodiment of this invention.

BRIEF DESCRIPTIONS OF THE SEVERAL VIEWS OF THE DRAWINGS

FIG. 1A is a fragmentary view of a cross section of one embodiment of a Thick Electrode Direct Reaction Fuel Cell of this Specification that generates electrical energy from high-hydrogen-content fuels, such as 100% methanol, without need of fuel dilution or a fuel reformer to extract $H_2$ by converting hydrogen and oxygen into electrical energy and water and disposing of carbon-based waste.

FIG. 1B is a magnified view of a portion of FIG. 1A showing a portion of the cell's cathode electrode.

FIG. 2 is a fractional perspective view of the fuel cell's cathode showing its protuberances that extend into CCF generated by TVF.

DETAILED DESCRIPTION OF THE INVENTION

This TEDRFC invention is an improvement over my invention described in my Case D. The fuel cells of Case D eliminated any requirement for a PEM by using TVF to prevent fuel and oxidizer cross-over. Referring to FIG. 1A of Case D, which is a fragmentary view of a cross-sectional view of my DRFC, electrolyte is injected through electrolyte input tube 26 to electrolyte chamber 24 located between cathode electrode fixed cylinder 12 porous inner surface layer 14 and anode electrode rotating cylinder 18 porous outer surface layer 20. The electrolyte flows in an axial direction within the cylindrical fuel cell 10 as TVF 54 and leaves the electrolyte chamber 24 through electrolyte exit tube 26.

As shown in FIG. 1B of Case D, the TVF 54 generate CCF 56 that interact chemically with catalytic protuberances extending from a cathode porous inner catalytic surface layer 14 into the electrolyte chamber 24. The electrolyte does not penetrate to any appreciable depth into the cathode electrode cylinder 12 or its porous metal web 30. FIG. 5B of Case D illustrates the relationship between electrolyte TVF 54, electrolyte CCF 56 and components of the cathode electrode 12.

Referring to FIG. 1A of this Specification, TEDRFC 10 comprises a porous cylindrical cathode 12 having an inner surface 14 fixed to metal frame 16 and separated from a porous cylindrical anode 18 having an outer surface 20. The cylindrical anode is journaled for rotation about an axis of rotation 22. The surfaces 14, 20 are separated by an electrolyte gap or chamber 24, which has an electrolyte input tube 26 and an electrolyte exit tube 28. Means for pumping electrolyte in the chamber 24 between the cathode 12 and the anode 18 electrodes in this embodiment include the input tube 26 and an electrolyte exit tube 28 in fluid circuit with a balance-of-plant (BOP—not shown) that supplies and processes electrolyte.

Because the cylindrical cathode 12 is fixed to metal frame 16 of cell 10, it cannot rotate (angular velocity $\Omega_2=0$) in this embodiment. Unlike the Case D fixed cylindrical cathode electrode 12, the TEDRFC cathode electrode 12 does not require the DRFC's porous inner catalytic surface layer 14 (Case D) because catalyst in the TEDRFC 10 is dispersed through the interior of the cathode 12.

The cylindrical anode 18 spins (angular velocity $\Omega_1 \neq 0$) around the axis 22 within the fixed cylinder 12. Also like the cylindrical cathode electrode 12, the anode electrode rotating cylinder 18 does not require a porous outer catalytic surface layer because catalyst is dispersed through the interior of the anode 18.

Cylindrical electrodes 12 and 18 are shown in the drawings as right-circular and coaxial; however, these attributes are not a requirement and other cylinder-like geometries (e.g., elliptical, conical, hyperbolic, irregular, different axes) may be employed. Also, it is practical to build TEDRFC where the inner cylinder 18 is fixed and the outer cylinder 12 rotates or both cylinders rotate at different speeds or directions. All that is required is that one of the electrodes 12 and 18 rotates relative to the other so that there is a rotational velocity difference between the electrodes 12 and 18 such that $\Omega_2 \neq \Omega_1$. Further, either of the electrodes 12, 18 may be an inner or outer electrode or be fixed or rotating, so long as so that $\Omega_2/\Omega_1 \neq 1$.

The inner cathode surface 14 of the fixed cylinder 12 has a radius $r_2$. The outer anode surface 20 of the rotating cylinder 18 has a radius $r_1$. An electrolyte chamber 24 having a gap of width $d=r_2-r_1$ is formed between the surfaces 14, 20 having radii $r_2$, $r_1$.

As described in my Case D where values for $\Omega_2$, $\Omega_1$, $r_2$ and $r_1$ are taught and shown in FIGS. 1A, 1B and 2, rotating one electrode 12, 18 with respect to the other electrode 18, 12 will generate TVF 54 about axes 60 and high-shear-rate CCF 56 in the electrolyte chamber 24. Cylindrical protuberances 62 of height h with domes of ř radius (as described in my Case D) extend from the cathode inner surface 14 into the CCF 56, which creates a pressure differential within the cathode 12 that wicks or draws electrolyte and reaction products from the cathode 12 into the TVF 54. The TVF 54 spins around axis 60 as it moves axially through the electrolyte chamber 24 in the direction shown by the arrow $A_E$. The anode 18 surface 20 also has protuberances (not shown) that extend into the CCF 54 and perform the same function as the cathode protuberances 62.

The cross-flow oxidizer and electrolyte mixture is shown in FIG. 2 as arrow $A_O$, which is transverse to the electrolyte flow between the electrodes 12, 18 as shown by the arrow $A_E$. The oxidizer and electrolyte mixture, containing reaction products such as steam and precipitates in the form of particles and bubbles 64 is drawn by the CCF 56 into the TVF 54. The particles and bubbles 64 are drawn into the center of the TVF 54 where they remained trapped until passing through the electrolyte exit tube 28. The particles and bubbles 64 then enter the BOP where particles are removed by filtering and water is scavenged for reuse or exhausted. The electrolyte in the electrolyte chamber 24 is then continuously restored to nominal composition by the BOP to maintain optimum performance.

The electrolyte in this embodiment is aqueous KOH; however, other electrolytes (e.g., alkaline, acid, organic, carbonate, molten) may be used.

As just described, the electrolyte chamber 24 is in fluid circuit with the BOP, electrolyte input tube 26 for supplying electrolyte and the electrolyte exit tube 28 for draining electrolyte, unreacted fuel or oxidizer, water and reaction products into the BOP (not shown). The BOP may comprise a source pump and the sink pump to propel electrolyte through the electrolyte chamber 24 and the pumps may be synchronized so that they pulse or propel electrolyte in unison and provide a proper pressure differential across the electrolyte chamber 24 to aid in pumping the axial flow of the electrolyte TVF 54 electrolyte between the cathode 12 and anode 18 electrodes.

An important feature of this invention is means for pumping a mixture of electrolyte and fuel or oxidizer cross-flow through one or both of the electrodes 12, 18. In this embodiment, an oxidizer manifold 30 is located between the metal frame 16 and the outer surface of the porous cathode 12. An oxidizer input tube 32 is in fluid communication with a set of nebulizer nozzles 34 that extend into the oxidizer manifold 30. The oxidizer input tube 32 that can be connected to a source (not shown) of a mixture of oxidizer and electrolyte.

In alkaline chemistry, some of the water produced by the anode and scavenged from the BOP is added to the mixture of oxidizer and electrolyte. In acid chemistry the water path is reversed.

Preferred oxidizers include purified air, oxygen or a liquid such as hydrogen peroxide, depending on choice of fuel and electrolyte. The oxidizer-electrolyte mixture is pumped into the oxidizer manifold 30 through the nebulizer nozzles 34 that break up the oxidizer-electrolyte mixture into a fine mist predominantly comprising a gas phase containing small liquid phase particles. The mist is sprayed cross-flow into the cathode 12 as shown by arrows $A_O$ in the cathode 12 that are adjacent the nozzles 34.

The oxidizer-electrolyte mist penetrates through the porous cathode 12, containing embedded catalyst particles, on cross-flow paths shown by the arrows $A_O$. The catalyst particle surfaces become coated with a very thin layer of electrolyte liquid first saturated with oxidizer and subsequently with reaction products and ions. This cross-flow penetration is in a direction that is transverse to the direction of the electrolyte moving axially with respect to the axis of rotation 22 in the electrolyte chamber 24 from the electrolyte input tube 26 to the electrolyte exit tube 28, as shown by arrows $A_E$. It is not necessary that the flows be at right angles (90°) to the electrode surface 14—electrolyte chamber 24 interface; however, it is preferable that the oxidizer mixture flow should be displaced by at least 45° from the electrolyte flow $A_E$.

The oxidizer mixture flow (shown by the arrow $A_O$) moves through porous cathode 12 that contains multiple catalyst particles embedded within the pores of the cathode 12. The catalyst particles may be those disclosed in Case C or Case D. In this embodiment, most—if not almost all—of the cathode 12 pores contain one or more catalyst particles. The oxidizer-electrolyte mist mixture flow then participates in a three-phase (catalyst-oxidizer-electrolyte) reduction reaction to produce hydroxyl anions $(OH)^-$ by extracting $H^+$ cations from water. The $(OH)^-$ anions are preserved in alkaline electrolyte. In acid electrolyte, they combine with $H^+$ cations to make water (steam) leaving an excess salt anion (e.g., $(PO_4)^{-3}$). The anions are swept by the flow (shown by the arrow $A_O$) to the inner surface 14 of the cathode 12.

High-energy-content fuel mixed with electrolyte enters the TEDRFC 10 (from a source not shown) through fuel input tube 36. The fuel-electrolyte mixture passes into fuel manifold 38 through rotor 40 and a set of nebulizer nozzles 42 that extend into the fuel manifold 38 located within the rotating cylindrical anode 18, which is supported on the rotor 40.

Preferred fuels are enumerated in Case D and include:
alkanes (paraffins)—methane, ethane, propane, butane, octane;
alcohols—methanol, ethanol, propanol, butanol;
kerosene; and
borohydrides—$LiBH_4$ $NaBH_4$ $KBH_4$.

These fuels are easily usable gasses, liquids or powders that can be dissolved in electrolyte liquids and dispersed through the nebulizer nozzles 42.

The fuel-electrolyte mixture is broken into a fine mist. Fuels in this invention may be heated by heat from the fuel cell reaction to transform them into a gaseous state. The fuel-electrolyte mixture is sprayed into the anode 18 as shown by arrows $A_F$ in the anode 18 cross-section that are adjacent the nozzles 42. The nebulizer nozzles 42 rotate with the anode 18 in this embodiment; however, they may rotate at another velocity or may be fixed.

The fuel-electrolyte mist penetrates through the porous anode 18 that contains multiple catalyst particles within the pores of the anode 18. Each of the catalyst particle surfaces becomes coated with a very thin layer of electrolyte liquid that is first saturated with fuel and subsequently saturated with reaction products and ions. The catalyst particles may be those disclosed in Case C or Case D. The particles may also comprise faradaic nanoflakes of $NiO(OH)/Ni(OH)_2$ described in Case F as faradaic materials; but, here they act as catalyst for the oxidation of hydrocarbon fuels. Because the catalyst particles readily adsorb hydrogen atoms from hydrocarbon molecules and release protons that oscillate rapidly between two valence states, it is an example of a catalyst momentarily participating in a redox reaction. In this embodiment, most—if not almost all—of the anode 18 pores contain one or more catalyst particles. The fuel-electrolyte mixture move on flow paths shown by the arrows $A_F$. This penetration is in a direction that is cross-flow to the direction of the electrolyte moving axially with respect to the axis of rotation 22 in the electrolyte chamber 24 from the electrolyte input tube 26 to the electrolyte exit tube 28, as shown by the arrows $A_E$.

Cross-flow also is shown in the FIG. 1A as transverse arrows $A_F$ and $A_E$ to display that fuel mixture flow (shown by the arrow $A_F$) in the anode cylinder 18 is transverse with respect to electrolyte flow (shown by the arrow $A_E$) in the electrolyte chamber 24. It is not necessary that the flows be at right angles (90°); however, it is preferable is that the fuel mixture flow should be displaced by at least 45° from the electrolyte flow.

The fuel-electrolyte mixture cross-flow, $A_F$, then participates in a three-phase (catalyst-fuel-electrolyte) oxidation reaction to produce hydrogen cations ($H^+$) or protons within the anode 18. The excess $H^+$ cations in acid electrolyte move cross-flow toward the anode outer surface 20 where they merge with the CCF 56 electrolyte. In an alkaline electrolyte, the ($H^+$) cations first combine with the ($OH$)$^-$ anions to make water-steam. Excess salt cations (e.g., $K^+$) from the electrolyte (e.g., KOH) move cross-flow toward the anode outer surface 20 where they merge with the CCF 56.

In a similar fashion, excess anions (e.g., ($OH$)$^-$ for alkaline electrolyte or $(PO_4)^{-3}$ for acid electrolyte) created within the cathode 12 move cross-flow, $A_O$, toward the inner cathode surface 14 where they merge with the CCF 56 electrolyte that also contains the cations. Once released into CCF, these coordinated ions, whether in acid or alkali electrolyte, are simultaneously and rapidly swept by TVF 54 between outer surface 20 of the anode 18 and inner surface 14 of the cathode 12 where they form a very dense ionic current as they neutralize each other.

In both anode and cathode processes described above, the presence of water in the form of steam, as well as fuel in gaseous form is regulated at liquid/vapor pressure equilibria by means for controlling temperature and a pressure. These means may include pressure relief valves, pumps, pH sensors and thermometers in the BOP.

When an aerosolized electrolyte and gaseous fuel or oxidizer mixture enters either of the porous electrodes 12, 18, the liquid phase forms a film over the available catalyst surface. The thick electrodes of this invention provide a great increase in the catalyst surface area over that available in conventional electrodes. One consequence is that the liquid film thickness decreases with increased catalyst surface area. The decreased thickness of the electrolyte-fuel or the electrolyte-oxygen solutions promotes rapid ion exchange (adsorption and desorption) of fuel or oxygen through an extremely thin saturated electrolyte film. The thin film will permit alcohol to react similarly to hydrogen at the catalyst surface. When augmented by elevated temperature and pressure, the thinner layer substantially reduces overvoltage of the oxygen reduction reaction (ORR).

The thin film in anode 18 moves slowly under differential cross-flow pressure and centrifugal force toward the electrolyte chamber 24. A similar oxygen/electrolyte thin liquid film and aerosolized gas flow is propelled through cathode 12 by a pressure differential between the oxidizer manifold 30 and the electrolyte chamber 24.

The description applies equally well to a mirror image of fuel cell 10 in which electrode 18 is a rotating cathode and electrode 12 is a stationery anode. My Case D teaches how to couple the fuel cell 10 with its mirror-image fuel cell on a common axis to eliminate a need for the collector ring and brush assembly 50 to connect the electrodes 12, 18 to the external electrical load 46. The same configuration will work with the TEDRFC.

Continuing with a description of fuel cell operation, an alkaline (e.g., KOH) electrolyte fuel cell converts hydrogen-rich fuel in the anode 18 into protons ($H^+$) that combine with ($OH$)$^-$ ions to make steam in the anode 18. The steam in thermal equilibrium with cross-flowing gas and liquid electrolyte containing excess $K^+$ cations is driven by a pressure differential toward the electrolyte chamber 24. Steam ($H_2O$) bubbles 64 emitted from the anode outer surface 20 and containing other gaseous products (e.g., $CO_2$) become trapped in the TVF electrolyte. The CCF 56 accelerate the transfer of both $K^+$ cations and ($OH$)$^-$ anions at very high velocities that are not attainable in PEM/MEA fuel cells where ions move only under small diffusion, dispersion, migration and concentration gradients between electrodes.

The cations and the anions move, respectively, between the anode 18 outer surface 20 and the cathode 12 inner surface 14 where, at both surfaces, the $K^+$ cations combine with ($OH$)$^-$ ions to restore alkalinity and neutralize excess ion concentration. Neutralization of excess ion at the surfaces 20 and 14 supports the flow of newly created ions toward these surfaces in the direction of the concentration gradient. Because of the very high CCF 56 velocities and stoichiometric requirements, the TEDRFC 10 electric current, power and energy densities can reach magnitudes that are not possible by fuel cells that do not utilize TVF.

The steam bubbles—along with other gas bubbles from reaction products (e.g., $CO_2$ bubbles) 64 (see FIG. 2) and unreacted fuel or oxidizer—are drawn to the centers of the TVF 54, as taught in Case D. The TVF 54 scavenge steam and $CO_2$ bubbles 64 and gaseous reaction products from both electrodes while retaining its essentially incompressible liquid character by holding gases within vortex centers. This is possible if axial electrolyte volumetric flow exceeds total gas flow by at least 3:1 and preferably 10:1. The bubbles and gasses remain trapped within the TVF 54 until the axially-moving TVF 54 drain through the electrolyte exit tube 28 and are removed from the TEDRFC 10 by Balance of Plant (BOP).

In batteries and fuel cells, electrical current density is a function of inter-electrode ion exchange velocity, which can be measured by the volumetric excess ion molar concentration, M, where, i amps/$cm^2$=M moles/ml×F; (where F=Faraday's constant=96,485 coulombs/mole), times an effective volumetric flow rate, v ml/$cm^2$-sec or cm/sec. In PEM and similar thin electrode reaction zones, excess ion creation is largely a surface effect adjacent an electrolyte-electrode interface.

In TEDRFC electrodes, excess ions begin to be created when fuel or oxidizer in aerosolized electrolyte enter the porous electrodes 12, 18 and accumulate additional excess ion molar concentration in cross-flowing electrolyte as it reaches the surfaces 14, 20 that interface with the electrolyte chamber 24. There, the excess ion concentration molarity value nominally is M, the electrolyte cross-flow velocity is v and the current density is i=MvF amps/$cm^2$.

Excess ions are always anions in the cathode 12 and cations in the anode 18 regardless of electrolyte/fuel/oxidizer chemistry. In TEDRFC these ions are largely in the form of an electric double layer (EDL) on catalytic surfaces. Fuel, oxidizer, reaction products and ions are transported in both directions across several Helmholtz layers into a diffusion and tangential shear flow boundary layer of electrolyte passing over catalyst particles. Electrokinetic energy potentials, inherent in the EDL, can be used to aid the movement of excess ions through the bulk electrode along with cross-flowing electrolyte.

In general, excess charges in the central rotating electrode 18 will be propelled radially outward and excess charges in the stationary enclosing electrode will be propelled radially inward. These charges carry an electrokinetic potential that can be force-coupled to electric and magnetic fields that may be arranged to propel ions in their preferred directions.

Electrokinetic energy in TEDRFC electrodes is complex from both an analytical and experimental perspective, so it will not be addressed in detail here. An excellent reference on electrokinetic ion transport is Delgado et al, *Measurement and Interpretation of Electrokinetic Phenomena*, Pure Appl. Chem., Vol. 77, No. 10, ©2005, pp. 1753-1805.

One convenient means for accelerating excess ion-bearing electrolyte through the electrodes 12, 18 utilizes electroacoustic kinetic energy. Delgado et al, in §4.6 beginning at p. 1784, teaches how acoustic excitation can cause a very small periodic displacement of charges in a fluid without disturbing particles (e.g., catalyst particles).

Piezoelectric electroacoustic transducers 58 generating electroacoustic kinetic energy in the electrodes 12, 18 are shown in FIG. 1A as attached to each end of the electrodes 12, 18. The transducers 58 are driven by an integral waveform power supply (not shown) deriving electricity from the fuel cell 10 or an external waveform power supply connected via slip rings and brushes (not shown).

A controllable acoustic wave creates an AC current and magnetic field by virtue of dissolved ionic vibration. This field can be coupled to a driving force (e.g., permanent magnets or programmable induction coils and magnetic poles disposed within anode chamber 38 and cathode chamber 40, not shown) that forces the electrolyte toward the electrolyte gap 24, if gas flow is insufficient.

The rotating electrode 18 creates its own magnetic field induced by the free charge current loop. The electrokinetic potential of essentially stable force fields can be controlled and harnessed to exert a driving influence on selected ionic specie in a preferred direction in a fashion similar to electrophoresis; especially under the added influence of magneto hydrodynamic forces.

Hydrocarbon fuels, such as methane, alcohols and kerosene and $NaBH_4$ have high energy densities per unit weight and unit volume. For example, methanol is capable of generating 1.21 volts and 6 electrons @ 700 kilo-Joules per mole (kJ/mole) and $NaBH_4$ can provide 1.64 volts and 8 electrons @ 1271 kJ/mole based upon their respective reversible Gibbs free energies. Nevertheless, these yields cannot be obtained in prior art direct reaction fuel cells before DRFC of my Case D because hydrocarbons and $NaBH_4$ have relatively slow oxidation catalyst reactions with lower temperature, acid electrolytes that are required for use with PEMs.

Hydrocarbon and $NaBH_4$ TEDRFC produce markedly higher power and energy densities because an alkaline electrolyte can be used to reduce polarization and catalyst poisoning. This is not possible in conventional DRFC before those of my Case D because there are no durable alkaline-electrolyte-compatible ion exchange membranes that can prevent fuel-oxidizer crossover in higher power fuel cells.

Thin MEA reaction zones of conventional PEM fuel cell would be less of a limitation on performance if three-phase reactions were instantaneous; but, they are not. If the residence time of ions in the reaction zone is less that the reaction time needed for the reaction to run to completion, then fuel or oxidizer are wasted and undesirable intermediate reaction products can remain to foul the reaction zones. The reaction zones in my TVF/CCF fuel cells are much thicker than MEA reaction zones and can readily provide a residence time that exceeds the reaction time. Hence, very little wasted fuel or oxidizer will reach the electrolyte chamber 24.

Saturated atomized droplets of an aerosol mixture of electrolyte and one gas from a group consisting of fuel and oxidizer cross-flow though at least one of the electrodes 12, 18 and form an extremely thin coating over catalyst surfaces. This is a very ideal chemical process reaction dynamic.

V. S. Bagotsky (Editor), *Fundamentals of Electrochemistry*, 2nd Edition, John Wiley, ISBN 13 978-0-471-70058-6, ©2006, §4.4 "Convective Transport", p. 61, teaches convective transport and offers an estimate of "the ratios of diffusion and maximum convective fluxes, $J_{df}/J_{kvf} \approx D_f/\delta v$ for a thin liquid film aerosol mixture of thickness, δ, flowing over a surface with velocity, v, where $D_j$ for typical electrolyte is $10^{-5}$ $cm^2$/sec and v is about $5\times10^{-2}$ cm/sec. The liquid film aerosol mixture thickness, δ, can be approximated by $(0.1\times D)/(3.6\times Tf)$ where D is the nominal diameter of a particle, catalyst or support, T is the thickness of the electrode in fractional cm and f is a flow factor related to porous fluid dynamics estimated to be about 0.5.

Because liquid film thickness, δ, is a fraction of particle diameter or not more than (⅓)D for a 2 mm thick electrode, when the ratio of gas to fluid volume is 4:1 or greater; diffusion through the thin film will be high compared to convective transport through the electrode. Thus, the means for pumping the aerosol mixture should comprise means for maintaining a gas-electrolyte volume ratio of at least 4:1 in the aerosol mixture cross-flow through at least one of the electrodes 12, 18.

The 4:1 or greater aerosol mixture ratio cannot be maintained as independent of other system variables. The fuel cell (10) must, in addition, comprise means for maintaining the aerosol mixture volume and the aerosol mixture electrolyte molar concentration at entry of the aerosol mixture into at least one of the electrodes (12, 18) in at least stoichiometric balance with at least one gas of the group consisting of fuel and oxidizer.

Typically, stoichiometric balance is maintained by a control system comprising means for metering steam vapor pressure, electrolyte vapor pressure, fuel volume and oxidizer mass flow. Heat from the fuel cell reaction creates a steam vapor pressure that may be used to establish basic system operating temperature and pressure as well as electrolyte concentration at equilibrium. Fuel stored at 100% concentration as a liquid can be positively metered. Oxygen must be measured and controlled as a mass flow component. Additional variables that should be monitored by the control system include cell voltage and current.

The control system must be able to control redox reaction variables so that there is adequate time for reactions to reach completion on catalytic surface densities approaching $10^5$ cm$^2$ per cm$^2$ of electrode-electrolyte interface. If the electrolyte pumping rate is too slow, then the fuel cell 10 current output will be restricted. If the pumping rate is too fast, then the electrodes 12, 18 will be flooded by coalescing droplets of electrolyte. By maintaining the minimum 4:1 gas-to-fluid volume ratio, a capillary meniscus thin layer attachment of the aerosol mixture to internal hydrophilic dispersed electrode surfaces is virtually guaranteed because of surface tension.

A nominal operating temperature of 150 to 250° C. will assure a gaseous state for all of the fuels enumerated above, as well as others that are practical sources of hydrogen. For example, an operating temperature of 250° C. is just above critical for both methanol and ethanol, where these fuels pass from their liquid to their gaseous states at any pressure. This temperature will provide virtually complete cathode and anode redox reactions.

The relevant properties for methanol and ethanol fuels are: 240° C. at 1,154 psi and 0.2722 gm/cc or $8.5 \times 10^{-3}$ mol./cc and 243° C. at 926 psi and 0.2755 gm/cc or $6 \times 10^{-3}$ mol./cc, respectively. As one possible example, 40% KOH electrolyte at 250° C. has a corresponding vapor pressure of 22 atm. or 323 psi with mass and molar density of 0.5596 gm/cc and $1.43 \times 10^{-2}$ mole/cc. Release of water vapor and $CO_2$ gas from the BOP at 22 atmospheres (atm) will maintain KOH temperature at 250° C. and 40% concentration. Cooling the exhaust by way of heat exchange to preserve some enthalpy for other uses will yield distilled water that can be recycled and reheated to humidify the pressurized and heated $O_2$ supply where, as noted above, it is a needed consumable.

The Gibbs values for methanol and ethanol are, respectively, about 700 and 1325 kJ/mole. Assuming a conservative conversion efficiency of 60%, the deliverable power values are 420 and 927 kJ/mole. This may be a higher conversion efficiency than is possible for ethanol because ethanol may require higher temperature in order to break covalent carbon double bonds before complete oxidation to $CO_2$ can be achieved.

Given the molar concentrations calculated above, a 10 amp/cm$^2$ current density rating that corresponds to $1.9 \times 10^{-5}$ and $8.63 \times 10^{-6}$ mole/sec-cm$^2$ or $7.6 \times 10^{-3}$ and $4 \times 10^{-3}$ cm/sec for methanol and ethanol, respectively. The latter values represent fuel feed velocity entering the back side of the anode 18. In addition, sufficient KOH flow must be added to support the redox reaction at all electrode depths. That would require at least 6 moles of KOH for every mole of methanol and 12 moles of KOH for ethanol's 12 electrons. The additional volume would require an additional $8 \times 10^{-3}$ or $16 \times 10^{-3}$ cm/sec, respectively, for a net $1.6 \times 10^{-2}$ to $2.0 \times 10^{-2}$ cm/sec.

At 50% electrode void fraction, these fuel feed velocities within the anode 18 is doubled over the prior estimate. If the fuel/electrolyte mixture velocity through the 50% porous anode 18 is approximately 300 to 400 microns per second or 12 to 16 mils per second for methanol and ethanol, respectively; then approximately 20 or 15 seconds is required for the aerosol mixture to move fully through a 6 mm-thick anode 18.

In the examples described above, the methanol fuel gas volume is comparable to the minimal 40% KOH droplet volume; whereas, ethanol volume is 4-times greater at the selected electrolyte hydroxyl concentration. The latter ratio, which is exceeded only by hydrogen and oxygen as carrier gases for atomized KOH, is better for nebulizing liquid electrolyte.

The same or higher aerosol mixture gas-to-electrolyte volume ratio can be achieved for methanol by using either higher concentrations of KOH. At 80% KOH concentration and 250° C., the vapor pressure drops to about 4 atm (60 psi), which is the same vapor pressure as 40% KOH at a lower temperature of approximately 150° C.

The vapor pressure-temperature data at higher KOH concentrations or lower operating temperatures will yield a control temperature and pressure that will permit selection of an aerosol mixture volume ratio for any fuel gas or oxidant that will support excellent nebulization of fuel or oxidizer into the electrolyte. For a fuel cell 10 using methanol fuel and generating 10 A/cm$^2$ of current per projected electrode area, a reasonable set of operating parameters would be 60% KOH or 2.45 mole/ml at 250° C. and an operating vapor pressure of 13.6 atm (200 psi). The nominal gas entry velocity becomes $11.95 \times 10^{-3}$ cm/sec while the liquid velocity drops to $3.26 \times 10^{-3}$ cm/sec or a suitable gas to liquid atomization ratio of 3.66. For all fuels or intermediates produced by chemical reactions occurring within the depth electrode at temperatures in the range of 100 to 300° C., water and the reaction products remain in the gas phase to support aerosol flow.

In addition to electrode thickness, catalyst particle size inversely affects fuel cell performance. If catalyst particles have a nominal characteristic size, D, such as the enclosing diameters of catalyst rods or spheres and catalyst particles that are packed or sintered in a volume with 50 to 60% material density (which is an optimum range for catalytic activity), then the active surface area multiple per unit of projected electrode area is fT/D, where T is electrode thickness and f is a numerical factor on the order of 2 (sintered) to 3 (packed) for solid particles or much greater for RANEY® particles.

An approximately 3 nm platinum particle has a surface area of 100 m$^2$/gram. State-of-the-art electrodes use less than 0.5 mg/cm$^2$ of carbon-supported platinum that exposes about one-half of the catalyst surface area. Therefore, the platinum catalytic surface factor is less than 250:1 but, as noted earlier, the platinum surfaces are dispersed with very low volumetric density for which the expression above does not apply.

If a porous electrode is 1 cm (10,000 microns) thick, and contains 10 micron particles, then it will have the equivalent surface factor multiple of about 2500:1. If smaller catalyst particles are used, then the surface factor is much higher.

Furthermore, a very important reason to make the particles much smaller is that pore size and particle size are closely related when aggregated into a porous structure. When the aerosolized, gas predominant, mixture of electrolyte and one of a group consisting of fuel and oxidizer enters the porous electrode, the liquid phase distributes over the available surface and liquid film thickness decreases with increased surface area—as described above.

For example, nickel and silver or gold-coated $MnO_2$ catalyst particles for methanol and oxygen, respectively, can be readily obtained as 10 nm particles, which yield 1000 times the surface area of 10 micron particles. These smaller particles can support nanometer electrolyte film thicknesses. Even if specific catalytic surface activity for these substitute catalysts is but a fraction of that for platinum, then their effective combined molecular and ion accelerated transport rate and expanded catalytic surface will support a considerable increase in current and power density.

An open pore conducting current collector having a material density of 5% but not more than 20% and pore dimensions of 200 nm to 250 microns can provide structural support and serve as a scaffold where very small catalyst particles can be sequestered and held in place. Commercially available vitreous carbon foams, electroless-plated with nickel or silver or injection molded and sintered particle mixtures can easily be created. Of particular interest are the electrode and current collecting scaffold structures described by Zhang, et al, *Three-dimensional bicontinuous ultrafast-charge and -discharge battery electrodes*, Nature Nanotechnology, Letters and Supplement (20 Mar. 2011). These structures are further described in Patent Application No. US 2010/0068623 of 18 MAR 2010 to Braun et al for *Porous Battery Electrode For A Rechargeable Battery And Method Of Making The Electrode*. My invention can employ thick electrodes using the structures for hydrocarbon oxidation on NiO(OH) nanoflake in the anode and electrodeposited $MnO_2$ having similar structure for the ORR in the cathode.

The surfaces of the current collector support structure or scaffold are not the principal catalyst surfaces. The principal catalyst surfaces can be provided by any of the types mentioned above or nano-scale nickel particles (e.g., RANEY® nickel) for the anode and silver, gold-coated $MnO_2$ particles for the cathode that can be sintered into the open pores of the scaffold structure.

Because the TEDRFC 10 utilizes TVF rather than PEM to prevent fuel or oxidizer crossover through the electrolyte gap 24, cross-flow of fuel and electrolyte through electrodes 12, 18 is both possible and practical. Cross-flow overcomes prior art restrictions on electrode thicknesses that do not exceed ~200 microns—and much less with PEM. An important feature of this invention is that TEDRFC 10 electrodes 12, 18 may be 250, 500, 1000, 5000 or 10,000 microns or more thick in the direction of electrolyte cross-flow and both mechanically stronger and less costly than a comparable quantity of thin, fragile MEA electrodes.

Further, the thick electrodes 12, 18 may be packed with substantially more catalyst to accelerate redox reactions by a factor of 200 or more times that possible with MEA. These factors foster a higher percentage of fuel and oxidizer conversion because more reaction sites are exposed and longer reaction times are enabled, which enables more complete fuel or oxidizer usage, fewer undesirable intermediate reaction products and lower fuel or oxidizer costs. As a result, current densities of 5, 10 or 20 ampere per $cm^2$ of electrode surface 14, 20 can be attained with low $i^2R$ losses in TEDRFC 10 that can compete commercially with other sources of electrical energy.

Thick electrodes can be constructed with carbon nanotubes (CNT) or electronic double layer (EDL) materials, such as multi-walled carbon nanotubes (MWCNT) mixed with the catalyst particles and in electrical circuit and physical contact with the electrodes 12, 18. These MWCNT have very high electric field charge and discharge rates and may be used to construct stand-alone, electrical energy storage components called supercapacitors. In the TEDRFC, the EDL materials are electrically charged by cross-flow of electrolyte and can provide additional surge current to meet sudden increases in a load. Carbon fullerenes can be circulated with the electrolyte as they would adsorb and carry excess free ions through the respective electrodes to augment the EDL effect. The carbon bearing ions become neutralized when entering the TVF 54 and can function equally well passing through either electrode. This is not possible in PEM fuel cells because they do not permit cross-flow of fuel or oxidizer.

TVF 54 also eliminate any need for PEM storage of electrolyte and prevents fuel or oxidizer crossover. TVF 54 remove a maximum operating temperature limitation of PEM (e.g., NAFION® polymer film) of approximately 190° C. The higher temperatures facilitate the use of low-cost nickel-based catalysts in place of expensive Platinum Group metals required by PEM fuel cells.

Operating temperatures of 200-400° C. facilitate up to 98% conversion of chemical energy in concentrated methanol or similar high energy density fuels into electrical energy with low-cost catalysts (e.g., silver, nickel, manganese, cobalt and iron) that eliminate need for expensive Platinum Group metal catalysts. Further, temperatures of at least 300° C. eliminate a 0.4-0.5 volt overvoltage (33% of the energy), irrespective of catalyst, which is normally lost in an oxygen reduction reaction (ORR) at lower PEM temperatures. Further, energy is not lost by creating formaldehyde or formic acid in alcohol oxidation reaction zones.

Because the TEDRFC 10 lacks any PEM, fuels do not have to be diluted to prevent damage to a PEM. Additionally, alkali electrolytes can be used that do not corrode metal electrodes and simplify removal of water. There is no risk of PEM mechanical failure due to shock or vibration nor is there any PEM leakage due to wear.

TEDRFC also operate at higher energy conversion efficiencies than conventional fuel cells such as methanol direct reaction fuel cells. Skowronski et al, *Nickel Foam-based (Ni(OH)$_2$/NiOOH Electrode as Catalytic System for Methanol Oxidation in Alkaline Solution*, ©2006, J. New Mat. Electrochemical Systems, Vol. 9, pp. 345-351, describes how peak currents of conventional methanol direct reaction fuel cells are limited by the formation of an excessively thick layer of oligomer film formed in the pores of NiOOH grains [that] hinders further reaction of methanol oxidation. (Page 349, col. 1, 11. 31-33). This cannot occur in TEDRFC.

One reason that the oligomer film forms over the electrode in a conventional methanol fuel cell is that the principal forces promoting ion migration in a conventional fuel cell are diffusion gradients (caused by intra-electrode electric charge forces), dispersion gradients (caused by mixing of a solute in a solvent), migration gradients (caused by inter-electrode electric charge forces) and concentration gradients (caused non-uniform molarity of a solute in a solution). These are relatively small forces that cannot prevent intermediate reaction products such as passive product[s] . . . of methanol oxidation from blocking the electrode surface involving catalytic species of NiOOH (Id., Page 351, col. 1, 11. 15-46) from adhering to electrodes. In TEDRFC, much stronger convection forces of the electrolyte-methanol cross flow through the anode 18 will sweep away intermediate products of methanol oxidation, such as formic acid and formaldehyde, and prevent the formation of the oligomer film.

The TEDRFC 10 is operated to produce electricity for transmission via anode electrical terminal 44 through external electrical circuit load 46 to cathode electrical terminal 48 by a process comprising the steps of:

i. Pumping electrolyte through electrolyte input tube 26 into electrolyte chamber 24 as the flow $A_E$;

ii. Pumping oxidizer and electrolyte mixture into the oxidizer input tube 32 and through nebulizer nozzles 34 where it becomes a mist in the oxidizer manifold 30 and then cross-flows $A_O$ through the cathode 12 into the electrolyte chamber 24;

iii. Pumping fuel and electrolyte mixture into the fuel input tube 36 and through nebulizer nozzles 42 where it becomes a mist in the fuel manifold 38 and then cross-flows $A_F$ through the anode 18 into the electrolyte chamber 24;

iv. Powering electric motor drive 52 to rotate the one cylinder 12, 18 with respect to the other cylinder 18, 12 at a rate $\Omega_2 \neq \Omega_1$ that is sufficient to create Taylor Vortex Flows 54 and Circular Couette Flows 56 in the electrolyte chamber 24 flow $A_E$ that cause cations and anions to react at electrode surfaces 14, 20 to form steam ($H_2O$), which—along with other reaction products (e.g., $CO_2$), unreacted fuel and unreacted oxidizer—become trapped in the electrolyte Taylor Vortex Flows 54; and v. Draining electrolyte containing $H_2O$ and other reaction products (e.g., $CO_2$), unreacted fuel and unreacted oxidizer from the electrolyte chamber 24.

As with DRFC 10 of Case D, the anode 18 oxidation reaction generates electrons ($e^-$) that travel from the anode 18 through a collector ring and brush assembly 50 to insulated electrical terminal 44 (−), which is connected to one terminal of external electrical load 46. Another terminal of the external electrical load 46 is connected to electrical terminal 48 (+) that is secured to the metal frame 16, which is electrically connected to the cathode 12, where the electrons ($e^-$) participate in the reduction reaction of the oxidizer.

Generally, the electrode surfaces 14 and 20 are coextensive. The gap d between facing surfaces 14, 20 in the electrolyte chamber 24 may vary somewhat by imparting a slightly cylindrical-conical shape, not shown, to either or both surfaces in order to establish a uniform pressure in axially flowing fluid contained within the chambers 24.

In every case, in accordance with the invention, electrolyte, whether or not recirculated for reuse, is contained within the electrolyte chamber 24 two surfaces 14 and 20, in this embodiment. As described above, the outer surface 14 may spin while the inner surface 20 remains fixed or both surfaces 14, 20 may rotate so long as $\Omega_2 \neq \Omega_1$. Rotation of the spinning cylinder 18 imparts energetic, but non-turbulent TVF 54 and CCF 56 in the electrolyte flow $A_E$ immediately upon entry of the fluid into its chamber 24.

The three-phase chemical reaction at catalyst surfaces within the electrodes 12, 18 of electrolyte and fuel or oxidizer is both temperature-dependent and exothermic. Fuel, electrolyte or oxidizer may be heated initially by balance-of-plant (BOP) or by internal heaters. Electrolyte recirculation through the BOP provides temperature control, pH adjustment, precipitate filtration and recovery of water produced by one electrode that may be needed by the other electrode.

In one embodiment, a fuel cell (10) containing means (24, 26, 28) for pumping electrolyte ($A_E$) between its porous cathode (12) and anode (18) electrodes comprising in addition means (32, 34, 36, 42) for pumping electrolyte cross-flow ($A_F$, $A_O$) through one of the electrodes (12, 18) in a direction transverse to that of the electrolyte ($A_E$) pumped between the electrodes (12, 18).

In one embodiment, a fuel cell (10) containing means (24, 26, 28) for pumping electrolyte ($A_E$) between its porous cathode (12) and anode (18) electrodes comprising in addition means (32, 34, 36, 42) for pumping electrolyte cross-flow ($A_F$, $A_O$) through one of the electrodes (12, 18) in a direction transverse to that of the electrolyte ($A_E$) pumped between the electrodes (12,18) wherein the means for pumping electrolyte cross-flow through one of the electrodes comprises means (32, 34, 36, 42) for pumping an aerosol mixture of electrolyte and one of a group consisting of fuel and oxidizer cross-flow ($A_F$, $A_O$) through one of the electrodes (12,18).

In one embodiment, a fuel cell (10) containing means (24, 26, 28) for pumping electrolyte ($A_E$) between its porous cathode (12) and anode (18) electrodes comprising in addition means (32, 34, 36, 42) for pumping electrolyte cross-flow ($A_F$, $A_O$) through at least one of the electrodes (12, 18) in a direction transverse to that of the electrolyte ($A_E$) pumped between the electrodes (12,18) wherein the means for pumping electrolyte cross-flow through one of the electrodes comprises means (32, 34, 36, 42) for pumping an aerosol mixture of electrolyte and one of a group consisting of fuel and oxidizer cross-flow ($A_F$, $A_O$) through one of the electrodes (12, 18) and/or comprising in addition (i) means for maintaining a gas-electrolyte volume ratio of at least 4:1 in the aerosol mixture pumped cross-flow through at least one of the electrodes (12, 18); and/or (ii) means for maintaining the aerosol mixture volume and the aerosol mixture electrolyte molar concentration at entry of the aerosol mixture into at least one of the electrodes (12, 18) in at least stoichiometric balance with at least one gas of the group consisting of fuel and oxidizer; and/or (iii) means for maintaining the aerosol mixture volume and the aerosol mixture electrolyte molar concentration at entry of the aerosol mixture into at least one of the electrodes (12, 18) in at least stoichiometric balance with at least one gas of the group consisting of fuel and oxidizer; and/or (iv) the stoichiometric balance is maintained by a control system comprising means for metering steam vapor pressure, electrolyte vapor pressure, fuel volume and oxidizer mass flow; and/or (v) at least one of the porous electrodes (12,18) contains catalyst particles; and/or (vi) the catalyst particles are mixed with carbon nanotubes; and/or (vii) one of the electrodes (12, 18) is at least 250 microns thick in the direction of electrolyte cross-flow ($A_F$, $A_O$); and/or (viii) one of the electrodes (12, 18) is not more than 10,000 microns thick in the direction of electrolyte cross-flow ($A_F$, $A_O$); and/or (ix) the means for pumping electrolyte between its cathode (12) and anode (18) electrodes comprises means (12, 18, 52) for creating Taylor Vortex Flows (54) in the electrolyte gap (24) between the electrodes (12, 18) and/or (x) comprises means (12, 18, 52) for creating Circular Couette Flows (56) in the electrolyte gap (24) between the electrodes (12, 18); and/or (xi) a mixture of catalyst particles and carbon nanotubes contained within at least one electrode (12,18) that is at least 250 microns thick in the direction of electrolyte cross-flow; and/or (xii) means (32, 34, 36, 42) for pumping an aerosol mixture of electrolyte and one of a group consisting of fuel and oxidizer cross-flow ($A_F$, $A_O$) through one of the electrodes (12,18), means (12, 18, 52) for creating Taylor Vortex Flows (54) in the electrolyte gap (24) between the electrodes (12, 18), and a mixture of catalyst particles and carbon nanotubes contained within at least one electrode (12,18) that is at least 250 microns thick in the direction of electrolyte cross-flow; and/or (xiii) an electroacoustic transducer (58) generating electroacoustic kinetic energy in at least one of the electrodes (12, 18).

In one embodiment, a method for producing electricity for transmission via anode electrical terminal (44) through external electrical circuit load (46) to cathode electrical terminal (48) by a process comprising the steps of: (i) pumping electrolyte through electrolyte input tube (26) into electrolyte chamber (24) as the flow ($A_E$); (ii) pumping oxidizer and electrolyte mixture into the oxidizer input tube (32) and through nebulizer nozzles (34) where it becomes a mist in the oxidizer manifold (30) and then cross-flows ($A_O$) through the cathode (12) into the electrolyte chamber (24); (iii) pumping fuel and electrolyte mixture into the fuel input tube 36 and through nebulizer nozzles (42) where it becomes a mist in the fuel manifold (38) and then cross-flows ($A_F$) through the anode (18) into the electrolyte chamber (24); (iv) powering electric motor drive (52) to rotate the one cylinder (12, 18) with respect to the other cylinder (18, 12) at a rate $\Omega_2 \neq \Omega_1$ that is sufficient to create Taylor Vortex Flows (54) and Circular Couette Flows (56) in the electrolyte chamber (24) flow $A_E$ that cause cations and anions to react at electrode surfaces (14, 20) to form steam, which—along with other reaction products, unreacted fuel and unreacted oxidizer—become trapped in the electrolyte Taylor Vortex Flows (54); and (v) draining electrolyte containing $H_2O$ and other reaction products, unreacted fuel and unreacted oxidizer from the electrolyte chamber (24).

CONCLUSION

The TEDRFC and catalytic electrodes of this invention offer electrochemical energy conversion systems far exceeding the long-standing 1-Ampere/$cm^2$ fuel cell electrode performance barrier of the prior art. While the present disclosure has been presented above with respect to the described and illustrated embodiments of TEDRFC using TVF and CCF, it is to be understood that the disclosure is not to be limited to those alternatives and described embodiments.

I claim:

1. A fuel cell (10) containing means (24, 26, 28) for pumping electrolyte ($A_E$) between its porous cathode (12) and anode (18) electrodes comprising in addition:
   means (32, 34, 36, 42) for pumping electrolyte cross-flow ($A_F, A_O$) through at least one of the electrodes (12, 18) in a direction transverse to that of the electrolyte ($A_E$) pumped between the electrodes (12, 18).

2. The fuel cell (10) of claim 1 wherein the cross-flow pumped electrolyte comprises:
   an aerosol mixture with one gas from a group consisting of fuel and oxidizer that is pumped cross-flow ($A_F, A_O$) through at least one of the electrodes (12, 18).

3. The fuel cell (10) of claim 2 wherein the means for pumping the aerosol mixture comprises:
   means for maintaining a gas-electrolyte volume ratio of at least 4:1 in the aerosol mixture pumped cross-flow through at least one of the electrodes (12, 18).

4. The fuel cell (10) of claim 3 wherein the means for pumping the aerosol mixture comprises:
   means for maintaining the aerosol mixture volume and the aerosol mixture electrolyte molar concentration at entry of the aerosol mixture into at least one of the electrodes (12, 18) in at least stoichiometric balance with at least one gas of the group consisting of fuel and oxidizer.

5. The fuel cell (10) of claim 4 wherein the stoichiometric balance is maintained by a control system comprising means for metering:
   a. steam vapor pressure;
   b. electrolyte vapor pressure;
   c. fuel volume; and
   d. oxidizer mass flow.

6. The fuel cell (10) of claim 1 wherein at least one of the porous electrodes (12,18) contains:
   catalyst particles.

7. The fuel cell (10) of claim 6 wherein:
   the catalyst particles are mixed with carbon nanotubes.

8. The fuel cell (10) of claim 1 wherein:
   one of the electrodes (12, 18) is at least 250 microns thick in the direction of electrolyte cross-flow ($A_F, A_O$).

9. The fuel cell (10) of claim 8 wherein:
   one of the electrodes (12, 18) is not more than 10,000 microns thick in the direction of electrolyte cross-flow ($A_F, A_O$).

10. The fuel cell (10) of claim 1 wherein the means for pumping electrolyte between its cathode (12) and anode (18) electrodes comprises:
    means (12, 18, 52) for creating Taylor Vortex Flows (54) in the electrolyte gap (24) between the electrodes (12, 18).

11. The fuel cell (10) of claim 1 wherein the means for pumping electrolyte between its cathode (12) and anode (18) electrodes comprises:
    means (12, 18, 52) for creating Circular Couette Flows (56) in the electrolyte gap (24) between the electrodes (12, 18).

12. The fuel cell (10) of claim 1 comprising in addition:
    a. means (32, 34, 36, 42) for pumping an aerosol mixture of electrolyte and one of a group consisting of fuel and oxidizer cross-flow ($A_F, A_O$) through one of the electrodes (12,18);
    b. means (12, 18, 52) for creating Taylor Vortex Flows (54) in the electrolyte gap (24) between the electrodes (12, 18); and
    c. a mixture of catalyst particles and carbon nanotubes contained within at least one electrode (12,18) that is at least 250 microns thick in the direction of electrolyte cross-flow.

13. The fuel cell (10) of claim 1 comprising in addition:
    an electroacoustic transducer (58) generating electroacoustic kinetic energy in at least one of the electrodes (12, 18).

* * * * *